E. T. GREENFIELD.
PROCESS OF MAKING TIRES.
APPLICATION FILED JAN. 17, 1907.
909,181.
Patented Jan. 12, 1909.
2 SHEETS—SHEET 1.
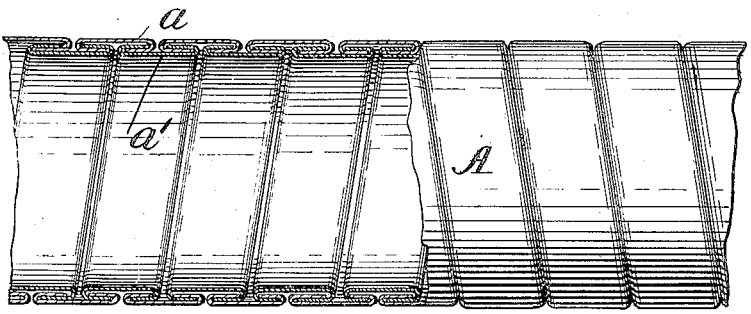
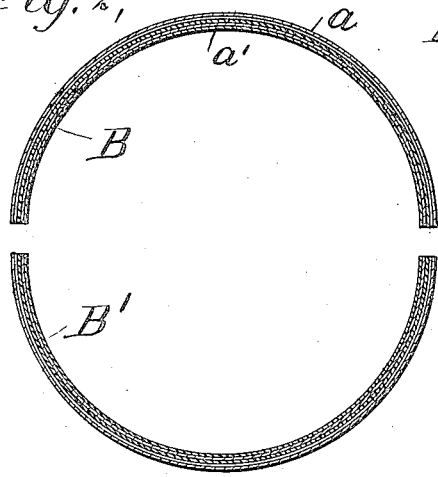
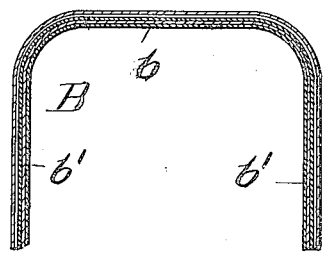
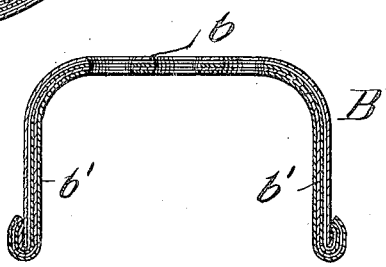
WITNESSES:
INVENTOR
ATTORNEY E. T. GREENFIELD.
PROCESS OF MAKING TIRES.
APPLICATION FILED JAN. 17, 1907.
909,181.
Patented Jan. 12, 1909.
2 SHEETS—SHEET 2.
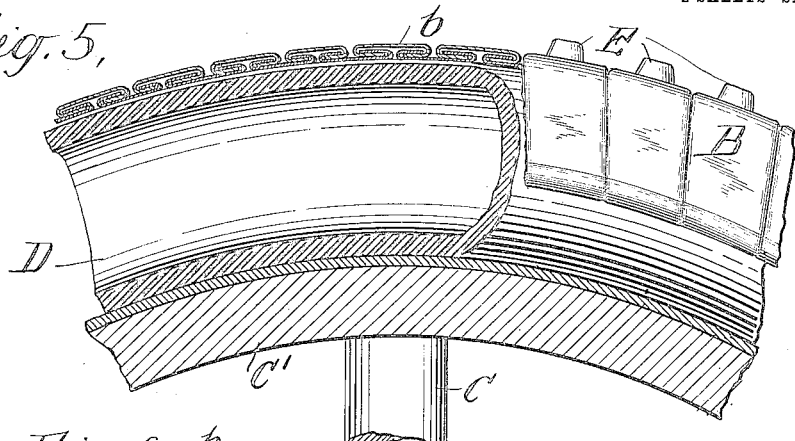
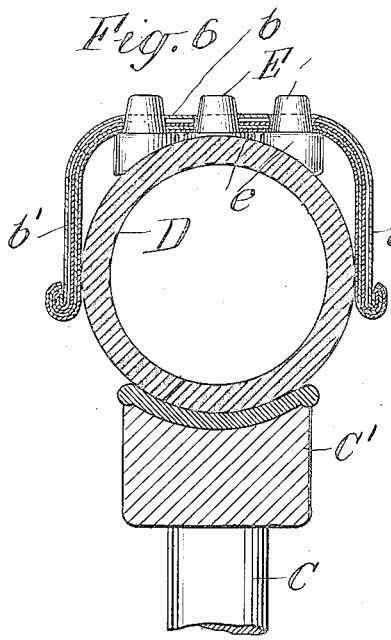
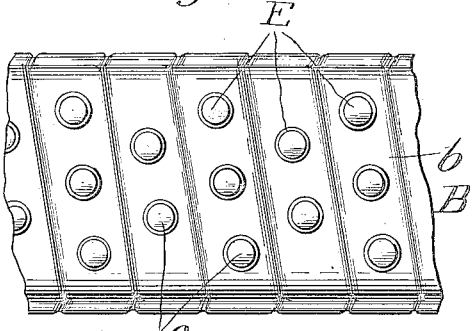
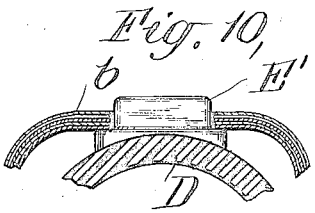
WITNESSES:
INVENTOR
BY
ATTORNEY

UNITED STATES PATENT OFFICE.

EDWIN T. GREENFIELD, OF KIAMESHA, NEW YORK.

PROCESS OF MAKING TIRES.

No. 909,181.  Specification of Letters Patent.  Patented Jan. 12, 1909.

Application filed January 17, 1907. Serial No. 352,692.

*To all whom it may concern:*

Be it known that I, EDWIN T. GREENFIELD, a citizen of the United States, residing at Kiamesha, in the county of Sullivan and State of New York, have invented a certain new and useful Improvement in Processes of Making Tires, of which the following is a specification.

This invention concerns armored resilient tires for the wheels of automobiles and other vehicles.

The invention is directed to the provision of a tire having a flexible metallic armoring and parts extending through openings in the armoring and movable relatively thereto, these parts being supported and pressed outwardly from the center of the wheel by a suitable resilient portion, preferably an inflated tube. In tires of this type having a metallic armoring and parts extending through openings therein and movable relatively thereto, I have found it of great importance that the armoring be not only metallic to afford ample protection for the inflated tube but that it be also quite flexible, and I therefore make the armoring of a plurality of metallic plates of comparatively small size each interlocked with and movable relatively to the plates adjacent thereto.

My invention involves the combination of a metallic armoring possessing ample flexibility and movable parts extending through openings in the armoring, these parts being supported on the inflated tube and their movement affording resiliency.

It also involves the process of making such a tire, which, broadly considered, consists in spiraling one or more strips of metal to form a tube, cutting this tube in half longitudinally and using the proper length of each half to form an armoring.

The preferred embodiment of the invention is illustrated in the accompanying drawings, in which—

Figure 1 is a sectional elevation of a spirally formed tube; Fig. 2 is a transverse section of the same, cut to form two armorings; Fig. 3 is a transverse section of one of the two parts shown in Fig. 2 shaped to the form required for an armoring; Fig. 4 is a transverse section of the completed armoring; Fig. 5 is a sectional elevation of a portion of a wheel having my improved tire thereon; Fig. 6 is a transverse section of the same; Fig. 7 is a top view of the tire; Fig. 8 is a perspective view of one of the movable parts; and Figs. 9 and 10 are views illustrating a modification.

Referring first to Figs. 1 to 4, the tube from which the armoring is formed consists of one or more strips suitably curved transversely and spirally-formed so that the adjacent edges of the strips interlock. In Fig. 1, the tube A is shown as consisting of two strips $a$, $a'$, each having folds at its edges, the folds on the strip $a$ lying on the outer side thereof and those on the strip $a'$ on the inner side. The lateral curving and the spiral forming of the strips may be performed on a suitable tube-making machine, as, for instance, that shown in my Patent No. 630,502. It will be seen that the tube thus formed is of metal and can be readily flexed in any direction. The tube thus formed is cut longitudinally to provide the two halves B, B', as shown in Fig. 2, and a suitable length of each of these halves is used to form an armoring. The original tube A may have an internal diameter substantially the same as the exterior diameter of the inflated tube of the tire, if it is desired to have the armoring lie snugly upon the inflated tube, but I prefer to make provision for spaces between the armoring and the inflated tube into which the tube may fill when it is depressed. For this purpose, I make the interior diameter of the tube A considerably greater than the exterior diameter of the inflated tube, and bend each of the halves B, B', to a U-shaped cross-section, substantially as shown in Fig. 3, from which it will be seen that the armoring has a central portion $b$ and flanges $b'$ at the sides of this central portion, which when the armoring is applied to the wheel extend inwardly one on either side of the inflated tube. By reason of the greater diameter of the tube A, these flanges $b'$ will extend inwardly of the wheel beyond the center line of the inflated tube. The ends of the flanges $b'$ are turned over upon themselves, as shown in Fig. 4, either simultaneously with the operation of bending the part B from a semicircular to a U-shaped cross-section or in a subsequent operation. On account of the interlock between the several plates forming the armoring, this turning over of the ends of the flanges $b'$ serves to preclude any movement of any one of the plates transversely. The armoring thus formed has a plurality of openings cut therein, through which the movable parts are to extend, as shown in Fig. 4. The size and shape of these openings may be varied as desired.

In Figs. 5, 6 and 7, I have shown the armoring applied over an inflated tube, the latter being mounted upon the rim of a wheel. In these drawings, C indicates the spokes of the wheel, C' the rim and D the inflated tube. Instead of the inflated tube, an uninflated tube or a solid rubber tire may be used. E, E, indicate the movable parts supported on the tread of the inflated tube D and extending through the openings formed in the plates of the armoring B. One of these parts is shown in perspective view in Fig. 8, from which it will be seen that the part has at its base a flange e of greater diameter than that of the opening through the armoring B, so that the part cannot move through the opening. The part E may be made of metal or a rubber composition, or may consist of a metallic casing having a rubber stud held therein.

Figs. 9 and 10 show a slight modification of the form of tire illustrated in the preceding figures, the difference lying in the shape of the openings in the armoring and the shape of the movable parts extending therethrough. In these figures, the movable parts E' are of oblong cross-section. In either of the two forms of tires, the projecting parts are preferably staggered, as shown in Figs. 7 and 9. With this form of tire, it will be seen that an armoring is provided which possesses great flexibility, as it consists of a great number of comparatively small plates, which are interlocked so as to be freely movable one relatively to the plates adjacent thereto. The requisite resiliency is afforded by the movement of the parts E radially of the wheel, these parts being moved inwardly, depressing the tube D, by obstructions of any kind in the roadway, and outwardly to their normal positions again by the tube D as soon as the obstruction is passed. In any case where movement of the parts E to such position that their ends are flush with the surface of the armoring is not sufficient, the obstruction in the roadway will engage the armoring and depress it, this being permitted by the flexibility of the armoring. By employing the process of making the armoring herein described, namely forming a tube by spiraling metallic strip, dividing this tube in half longitudinally and using a suitable length of each half to form an armoring, the cost of the latter is materially decreased. A further saving in the cost of the complete tire results from the fact that the protection afforded by the metallic armoring permits of using a less expensive form of rubber tube.

Having now described my invention, what I claim as new therein and desire to secure by Letters Patent is as follows:—

1. The process of making a tire, consisting of bending strip-metal laterally, forming said strip-metal spirally into a tube with the edges of adjacent convolutions interlocking, cutting said tube longitudinally, turning the edges of the armoring thus formed to interlock the ends of adjacent plates thereof against relative movement in the direction of the length of the plates, and applying a suitable length of the armoring about a resilient tube, substantially as set forth.

2. The process of making a tire, consisting of bending strip-metal laterally, forming said strip-metal spirally into a tube with the edges of adjacent convolutions interlocking, cutting said tube longitudinally into two substantially equal parts, bending a suitable length of one of said parts from an arc-shaped to a U-shaped cross-section, turning the edges of said part so as to interlock the ends of adjacent plates thereof against relative movement in the direction of the length of the plates, and applying said part about a resilient tube to form an armoring therefor, substantially as set forth.

This specification signed and witnessed this 14th day of January, 1907.

EDWIN T. GREENFIELD.

Witnesses:
S. O. EDMONDS,
D. J. EDMONDS.